United States Patent
Saario

[11] 3,861,866
[45] Jan. 21, 1975

[54] CIRCULATING AIR OVEN

[76] Inventor: Pekka Juhani Saario, Martinkata 31, Hyvinkaa, Finland

[22] Filed: Dec. 28, 1973

[21] Appl. No.: 429,174

[30] Foreign Application Priority Data
Oct. 16, 1973   Finland.............................. 3203/73

[52] U.S. Cl..................... 432/152, 415/123, 432/57
[51] Int. Cl............................................. F27b 3/22
[58] Field of Search .......... 415/123; 432/56, 57, 48, 432/152

[56] References Cited
UNITED STATES PATENTS
| | | | |
|---|---|---|---|
| 2,080,719 | 5/1937 | Houlis.................................. | 432/48 |
| 2,228,088 | 1/1941 | Roth .................................... | 432/48 |
| 3,536,413 | 10/1970 | Hosono et al....................... | 415/123 |

FOREIGN PATENTS OR APPLICATIONS
893,117   10/1953   Germany ............................ 415/123

Primary Examiner—John J. Camby
Attorney, Agent, or Firm—Waters, Roditi, Schwartz & Nissen

[57] ABSTRACT

Circulating air oven for the baking of bakery products in flowing hot air, in which oven the air circulates in the air space constituted by the baking space and a circulating air duct and which oven comprises a circulating air heater and a circulating air blower with impeller, drive motor and transmission means. The circulating air oven furthermore comprises a brake means, which has been fitted in connection with the circulating air blower so that the blower can be stopped when desired by the aid of said brake means.

6 Claims, 3 Drawing Figures

PATENTED JAN 21 1975    3,861,866

CIRCULATING AIR OVEN

FIELD OF THE INVENTION

This invention relates to circulating air ovens.

BACKGROUND

Circulating air ovens of the type with which the invention is concerned are commonly used in bakeries. The products to be baked are usually introduced into the oven with a so-called rack wagon, upon the plates or trays of which the products are also baked in the oven. It is furthermore common practice to rotate the rack wagon during the baking process or to move them otherwise with the aid of particular machinery, so that the products will be evenly baked on all sides.

Circulating air ovens have usually been arranged to operate automatically so that on opening of the oven door either for removal of products from the oven or for their insertion therein, the electric supply to the drive motor of the circulating air blower automatically cuts off and the motor becomes stationary. In that case, the blower still continues to operate for some time prior to becoming completely stationary, owing to the inertia resulting from the circulating air blower's rotation. The duration of the blower's continued rotation after disconnecting its supply is several tens of seconds or even several minutes. During this period, the blower circulates the baking air in the air space of the oven, in which connection there is, naturally, exchange of air through the door. This air exchange due to the inertia of the blower's rotation constitutes a major problem particularly in connection with the insertion of products to be baked into the oven. This is because, together with the air welling out from the oven, a considerable amount of water vapour is also expelled, as a result of which the humidity of the baking air will go down. This has the objectionable consequence of drying out of the products in the baking phase proper, the air which has dried in connection with the opening of the door causing substantial evaporation of moisture from the products in the baking process. This is particularly true for white bread, French loaves, breakfast rolls or buns and the like, which are bakery products for which an attempt is made to keep the water vapor content of the baking air at a relatively high level, e.g., at the saturation point or even higher. This is because, by the high humidity of the baking air at the initial phase of the baking process, condensation of moisture on the surface of the products is caused, which in its turn results in tasty products having a crisp skin.

Furthermore, the hot baking air, which may have a temperature as high as 300°C, introduces a direct factor endangering the baker when it emerges from the oven as the door is opened and hits his face.

The hot air mass escaping from the oven on opening of the door also causes a considerable loss of heat, which is quite appreciable owing to the high heat content because of the great quantity of water vapor present in the baking air.

It may further be noted that the wait for the circulating air blower to stop, after the electric supply of its drive motor has been disconnected, implies harmful and uneconomical interruptions in the production and slows it down.

SUMMARY OF THE INVENTION

An object of the present invention is to eliminate the above-mentioned drawbacks.

The object of the invention is achieved by the provision of apparatus which is characterized in that the circulating air oven comprises a brake means fitted in connection with the circulating air blower so that the blower can be stopped when desired.

It is thus possible to stop the circulating air blower immediately at any desired moment, whereby at the opening of the oven door, the air exchange through this door and the lowering of humidity of the baking air are not as harmful as in circulating air ovens of prior art. As a result, it is possible to maintain the humidity of the baking air within desired limits and, particularly, at a rather high level, as is indispensable when processing French white bread, breakfast rolls or buns and the equivalent.

It is further noted that a circulating air oven according to the invention considerably improves the work safety of the baker in that the brake means eliminates the risk of hot air hitting the baker's face. In addition, the heat losses incurred in connection with the baking process are reduced by virtue of the invention, and the baking operation may be pursued without interruptions.

In a particularly advantageous embodiment of the invention, the brake means consists of a friction brake. In that case, the said friction brake may, of course, be any kind of brake based on friction which is known in prior art in itself, such as a disc brake, band brake, cone brake, or the like. It is also possible in this connection to use brakes known in themselves which are based on the resistance of a fluid, such as a liquid of powdery substance, and which are of the decelerator type.

In another advantageous embodiment of the invention, the brake means consists of an electrical friction brake. It is then possible to use any resistance brake known in itself, such as a self-excited resistance brake or one with external excitation.

In a third embodiment of the invention, the brake means is connected with the impeller of the circulating air blower so that the brake acts immediately on said impeller. The effect of the brake on the ceasing of blowing action is then immediate and thereby expedient.

In a fourth embodiment, the brake means is connected with a transmission means of the circulating air blower, such as a shaft, so that the brake acts upon the impeller via said transmission means. The brake may then be applied, for instance, to the transmission means between the drive motor and the impeller or, for the brake, a brake force transmitting means of desired kind may be constructed, which in its turn acts upon the impeller.

In still another embodiment of the invention, the brake means is connected with the drive motor of the circulating air blower so that the brake acts upon the impeller via the drive motor. It is then possible advantageously to use a socalled cone brake, whereby the drive motor and also the impeller of the blower may be stopped within a very short time.

BRIEF DESCRIPTION OF THE DRAWING

The invention is described in the following by the aid of examples and with reference to the attached drawing, wherein.

DETAILED DESCRIPTION

Figure 1:
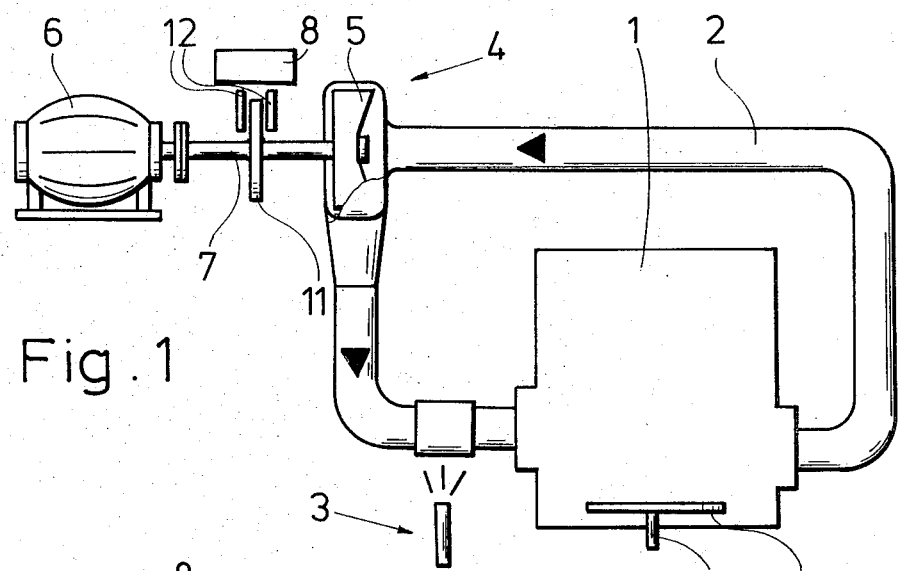
FIG. 1 is a schematic view of one embodiment of the invention.

The circulating air oven according to the invention comprises a baking space 1 and a circulating air duct 2, which together constitute the air space of the oven. The oven further comprises a circulating air heater 3 and a circulating air blower 4 with an impeller 5, a drive motor 6 and transmission means 7.

The transmission means 7 consists, in FIG. 1, of a shaft on which a brake means 8 has been fitted, by the aid of which the circulating air blower 4 can be stopped when desired. The brake means 8 is a disc brake, wherein the brake discs 12 are urged against the brake disc 11 when braking.

Figure 2:
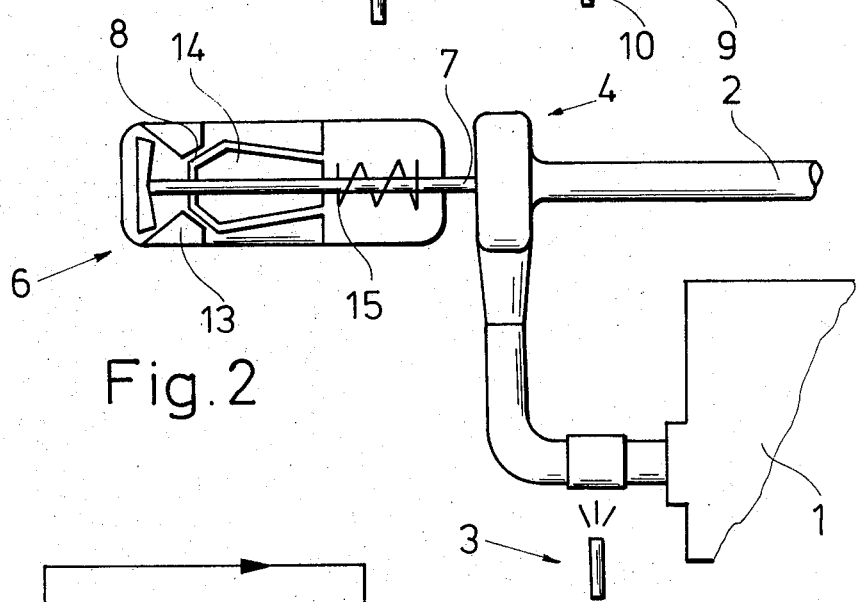
FIG. 2 is a schematic view of another embodiment of the invention.

In FIG. 2, another embodiment of the invention has been shown, wherein the brake means 8 is fitted in connection with the drive motor 6 and it consists of a cone brake. In the cone brake, the conical friction surfaces 13 are separated while the motor is running, in which situation the magnetic fields of the rotor 14 and of the stator enclosing it cause a compression of the spring 15. When the electric supply of the motor is cut off, the magnetic field disappears and the spring 15 urges the rotor 14 to make the friction surfaces 13 meet, and the motor stops. As it stops, the motor 6 also stops the blower 4 by stopping of the shaft 7. The blowing action in the oven 1 will then cease and the oven door may be opened without risk and without delay.

Figure 3:
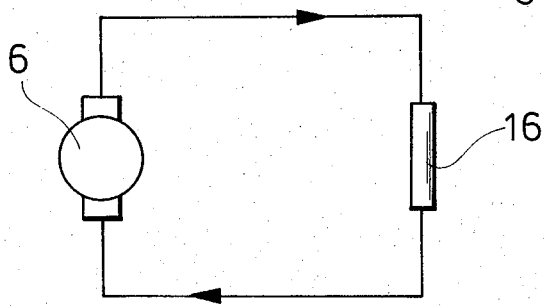
FIG. 3 illustrates a third embodiment of the invention.

FIG. 3 shows in the form of a simplified circuit diagram a resistance brake, with external excitation, of the blower drive motor 6, where braking is effected by the aid of a resistor 16.

As it stops, the drive motor 6 also stops the circulating air blower.

It will be obvious to one skilled in the art that the invention is not confined to the examples presented but that it may vary within the scope of the attached claims. The circulating air oven according to the invention may, for example, comprise any additional fixtures known in themselves, such as a rotating base 9 with drive shaft 10 for the rack wagons, as has been shown in FIG. 1, or control equipment for the circulating air humidity, temperature, etc. The principle of operation of the brake means comprised in the oven may also vary and it may operate by the aid of any pressure fluid, of a mechanical means or of electricity.

I claim:

1. Apparatus comprising a circulating air baking oven provided with a baking space for baking bakery products in flowing hot air, in which oven the air circulates in the baking space, a circulating air heater, a circulating air blower operatively associated with said oven and heater for circulating heated air into said oven, said blower including with impeller means, drive motor means and transmission means coupling said motor to said impeller, said impeller circulating air to said oven, and brake means operatively associated with the circulating air blower so that the blower can be stopped when desired.

2. Apparatus as claimed in claim 1, wherein the brake means includes a friction brake.

3. Apparatus as claimed in claim 1, wherein the brake means includes an electric resistance brake.

4. Apparatus as claimed in claim 1, wherein the brake means is connected to the impeller means and acts directly upon said impeller means.

5. Apparatus as claimed in claim 1, wherein the brake means is connected to the transmission means and acts upon the impeller means through said transmission means.

6. Apparatus as claimed in claim 1, wherein the brake means is connected to the drive motor means and acts upon the impeller means through said drive motor.

* * * * *